(12) United States Patent
Brockway et al.

(10) Patent No.: US 7,140,002 B2
(45) Date of Patent: Nov. 21, 2006

(54) METHOD AND SYSTEM FOR AUTOMATIC CODE GENERATION ACCESSING FUNCTIONALITY IN A REMOTE PROCESS

(75) Inventors: Brandon Brockway, Austin, TX (US); Michael Richard Cooper, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 10/290,220

(22) Filed: Nov. 7, 2002

(65) Prior Publication Data

US 2004/0093586 A1 May 13, 2004

(51) Int. Cl.
G06F 9/44 (2006.01)
G06F 3/00 (2006.01)
(52) U.S. Cl. .................. 717/106; 719/315; 719/330
(58) Field of Classification Search ............. 717/106, 717/108, 140, 141; 719/320, 315, 330; 709/223
See application file for complete search history.

(56) References Cited

U.S. PATENT DOCUMENTS

| 6,282,568 | B1 * | 8/2001 | Sondur et al. .............. 709/223 |
| 6,957,228 | B1 * | 10/2005 | Graser .................... 707/103 R |
| 2003/0056195 | A1 * | 3/2003 | Hunt .......................... 717/116 |
| 2004/0015835 | A1 * | 1/2004 | Kotnur et al. .............. 717/106 |
| 2004/0015898 | A1 * | 1/2004 | Tewksbary ................... 717/140 |

OTHER PUBLICATIONS

"Java™ IDL: Changes between JDK 1.2 and J2SE 1.3," *Sun Microsystems, Inc.*, copyright 1996-2000, available via the Internet at http://java.sun.com/j2se/1.3/docs/guide/idl/jidlChanges.html, 2 pp.
Mahmoud, "Distributed Java Programming with RMI and CORBA," *Sun Microsystems, Inc.*, copyright 1995-2002, available via the Internet at http://developer.java.sun.com/developer/technicalArticles/RMI/rmi_corba/, 11 pp.
"Chapter 11: Overview of CORBA," available via the Internet at http://developer.java.sun.com/developer/technicalArticles/RMI/rmi_corba/ go to link: *Distributed Programming with Java book (Chapter 11: Overview of CORBA*, pp. 153-161.

* cited by examiner

*Primary Examiner*—Tuan Dam
*Assistant Examiner*—Isaac T Tecklu
(74) *Attorney, Agent, or Firm*—Winstead Sechrest & Minick (57) ABSTRACT

A mechanism for automatically generating code, in particular high level source code for remotely accessing functionality running in a remote process is provided. Given a specified set of functionality, which may be defined via an interface, for providing functionality to a local process, the mechanism generates, in source code form, software for remotely accessing the functionality by an application running in another process, that is, for accessing the functionality by an application running a second process. The code may be generated at build time but before the actual build of a software product implementing the functionality.

20 Claims, 8 Drawing Sheets

METHOD AND SYSTEM FOR AUTOMATIC CODE GENERATION ACCESSING FUNCTIONALITY IN A REMOTE PROCESS

TECHNICAL FIELD

The present invention relates in general to data processing systems, and in particular, to remote process invocation in a data processing system and the automatic generation of code implementing remote method invocations for accessing functionality in a remote process.

BACKGROUND INFORMATION

Modern data processing environments include both distributed processing in which an application running on a first data processing system utilizes the services of a second application running on a second data processing system. One such environment, for example, are web services. For the purposes herein, the application seeking the services, or equivalently, functionality, of the second application may be referred to as the client, and the application providing the functionality (and any communication interface associated therewith) may be referred to as the server.

Alternatively, modern data processing systems are also typically multiprocess environments, in which multiple processes may simultaneously share the competing resources of the system. (A process may be viewed as an instance of an application.) As would be appreciated by those of ordinary skill in the art, the multitasking capability may be effected via the operating system; the system hardware itself may constitute a single central processing unit (CPU). In such a multitasking environment, one process may utilize the services of another, second, process to provide functionality implemented in the second process. Such systems provide a mechanism for interprocess communications whereby the services of the second process may be requested by the first process. These will be discussed further hereinbelow in conjunction with FIG. 1.

To provide for the distribution of tasks among the processes as heretofore discussed, several mechanisms have been provided in the data processing art. For example, the Unix operating system (and derivatives thereof) provide a Remote Procedure Call (RPC) services. Other examples include the Remote Method Invocation (RMI) which is provided in the Java programming environment. Generally, a particular set of functionality in an application requires, in addition to the interface defining the methods of the application, a remote server that listens for requests from a client and a client that communicates with the remote server. In a typical implementation, the functionality that is to be remotely accessible is the same as that functionality provided locally. As changes are made to the functionality, either by adding functionality or removing functionality or both, the corresponding server and client code must be updated accordingly to mirror the changes made to the functional interface that defines the functionality available to the local process. This can be both a time consuming and an error prone process.

Consequently, there is a need in the art for mechanisms for automatically generating the code necessary to implement interprocess communications in distributed data processing system. (For the purposes herein, distributed data processing environments may be understood to refer both to environments including multiple data processing systems connected via a network and to environments in which the data processing systems support concurrent processes.)

Additionally, it is advantageous that the architecture of the mechanism defines structures that permit the communication mechanism be substantially hidden from the client software. In other words, the client's software should be substantially transparent to the interprocess communication. That is, from the perspective of the client software, the client appears to be communicating within the local process although it may actually be communicating with a remote server running in a separate process (whether on a different or the same machine).

SUMMARY OF THE INVENTION

The aforementioned needs are addressed by the present invention. In one embodiment, a method for or producing source code for remotely accessing functionality in a local process may be performed. The method includes generating a remote interface corresponding to a predetermined local interface and generating a factory class corresponding to a class of the local interface. The factory class returns a reference to the local interface. A remote client accessing the functionality in response to the reference. The method also includes generating a remote server class in which the remote server class is operable for obtaining a reference to an implementation of the local interface and generating a wrapper class of the remote interface. The wrapper class is operable for obtaining a reference to an instance of the remote server class in which the wrapper class operable for accessing the functionality via an instance of the remote server class.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

A mechanism for automatically generating code, in particular high level source code for remotely accessing functionality running in a remote process is provided. Given a specified set of functionality, which may be defined via an interface, for providing functionality to a local process, the mechanism generates, in source code form, software for remotely accessing the functionality by an application running in another process, that is, for accessing the functionality by an application running a process different from the process implementing the functionality.

In the following description, numerous specific details are set forth to provide a thorough understanding of the present invention. For example, exemplary code which may be generated by the present inventive principles may be described, however, it would be recognized by those of ordinary skill in the art that the present invention may be practiced without such specific details and in other instances, well-known circuits have been shown in block diagram form in order not to obscure the present invention in unnecessary detail. Refer now to the drawings wherein depicted elements are not necessarily shown to scale and wherein like or similar elements are designated by the same reference numeral through the several views.

Figure 1:
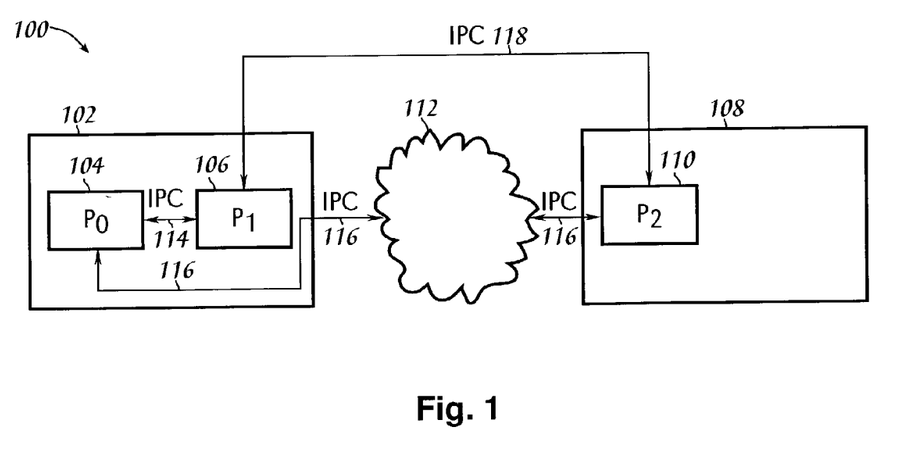
FIG. 1 illustrates a representative distributed processing environment which may be used in conjunction with the present invention.

FIG. 1 illustrates a representative architecture 100 for a distributed data processing environment. Data processing system 102 includes two processes $P_0$ (104) and $P_1$ (106) running therein. A third process, $P_2$ (110) runs on data processing system 108. It would be appreciated by those of ordinary skill that the particular hardware context embodying data processing systems 102 and 108 are not restricting with respect to the principles of the present invention, and may included, for example, workstations, mini computers, mainframe computers, etc. It would also be appreciated that the present inventive principles may be incorporated within a multiplicity of hardware architectures, including single CPU and multi-processor systems. It would also be recognized that a multiprocess system such as illustrated by system 102 would typically include more than two processes running concurrently. Systems 102 and 108 are connected via network 112 which may include a local area network (LAN), a wide area network (WAN) or a network of networks such as the Internet.

Each of processes $P_0$, $P_1$ and $P_2$ embodies a set of functionality, that is, operations which the respective processes may perform. The set of functionality embodied in a corresponding one of processes $P_0$-$P_2$ and available for execution by the process itself constitute the local implementation of the functionality. Conversely, functionality in a first one of processes $P_0$–$P_2$ and available to a second one of the processes constitutes remote functionality with respect to the second process, which process may be referred to as the client process. Functionality between processes may be requested and serviced via an interprocess communication (IPC). Thus, IPC 114 intermediates between processes $P_0$ and $P_1$ and IPC 116 between $P_0$ and $P_2$ Similarly, IPC 118 intermediates remote functionality invocations between processes $P_1$ and $P_2$. Note that the particular communications protocols, that is the protocols specifying the transport of the data affecting the remote method invocations, are not implicated by the present inventive principles. In other words, persons of ordinary skill in the art would recognize that the interprocess communication methodologies and the data communicated in response thereto are independent of the network communication protocols or operating system protocols which effect the transport of the communications between the processes.

The processes must interface to these protocols, and a several application program interfaces (API) have been promulgated. These include the remote procedure call (RPC) protocol, the Common Object Request Broker Architecture (CORBA), Active X, and the Java Remote Method Invocation (RMI) framework. For the present purpose, it would be assumed that the API framework provides for object serialization. That is, the complete state of an object can be written to an output string, and the object recreated by reading the serialized state form an input string. In particular, it is assumed for the purposes herein that the functional interface defining the methods implemented by the local implementation is serializable. (It would be appreciated by those of ordinary skill in the data process art, particularly ordinarily skilled artisans in Object Oriented Programming, that an interface is an abstract class that define a particular set of functionality. The methods of the interface that specify the functionality that a concrete class implementing the interface provides.) This may be further understood by referring now to FIG. 2.

Figure 2:
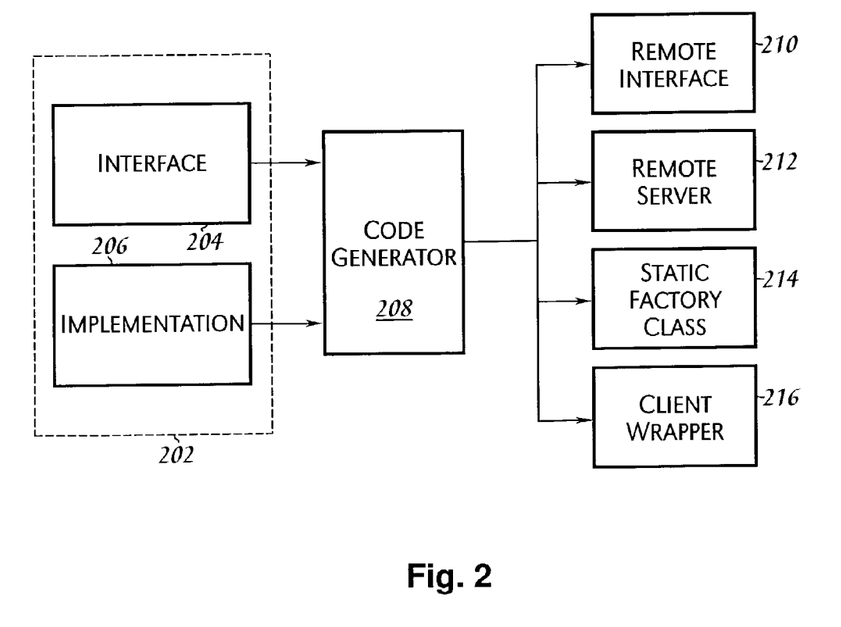
FIG. 2 schematically illustrates a high level code generation architecture in accordance with the present inventive principles.

FIG. 2 illustrates a high level code-generation architecture, in accordance with the present inventive principles. The tasks performed by a particular software program are embodied in a set of methods which are respectively defined and implemented by interfaces, illustrated as interface 204 and implemented by objects that provide concrete sets of programming instructions that represent the operations for performing the tasks, represented by implementation 206. (For simplicity of terminology, interface 204 may be used to refer to one or more interfaces and implementation 206 may be used to refer to one or more corresponding implementations.) As previously noted, the interfaces represent abstract classes which define the set of functionality that is, the tasks, and the implementations 206 constitute the code (in a high level programming language) that implements the interface, such as interface 204. Together these represent the functionality 202 accessible to a local process that embodies the executable image derived therefrom. (In bytecode interpreted programming languages such as Java, it would be recognized by those of ordinary skill in the art that the executable image may refer to the bytecode derived from the high level source code. The bytecode may be viewed as the object code for a virtual machine, such as the Java Virtual Machine (JVM).)

Figure 3:
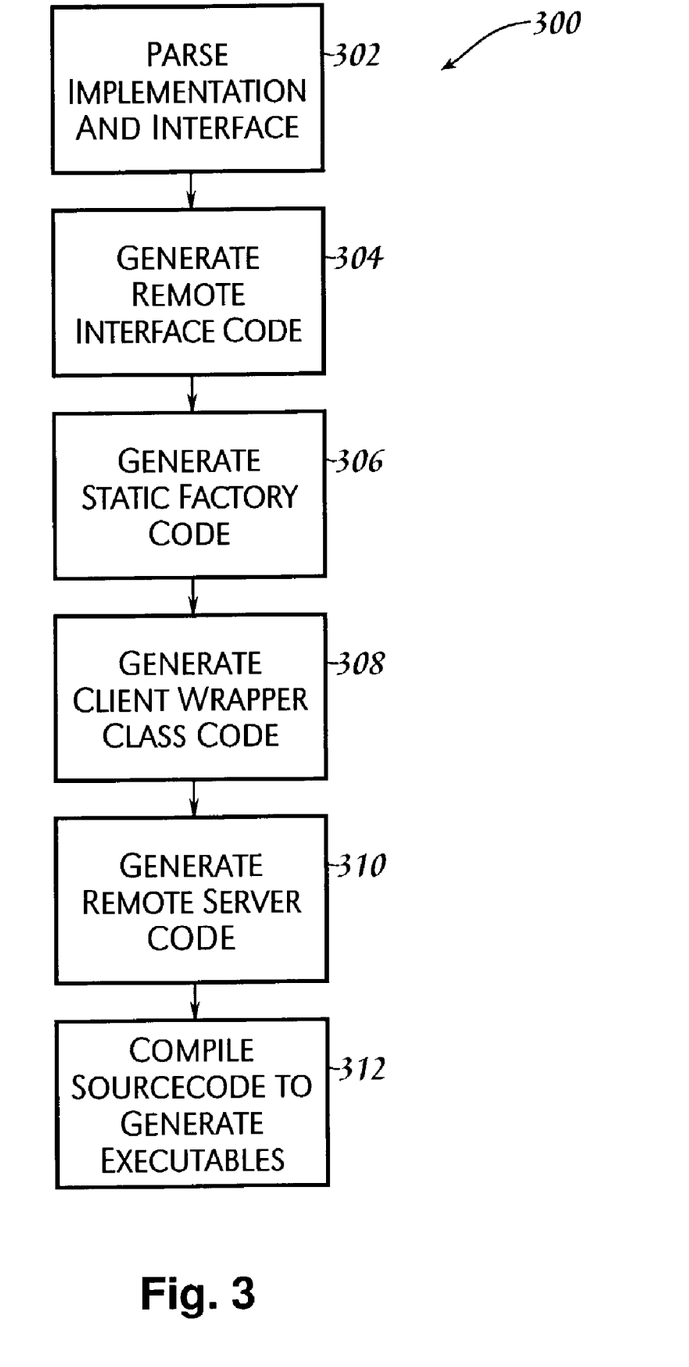
FIG. 3 illustrates a high level flow chart of a methodology for automated code generation in accordance with an embodiment of the present invention.

For the purposes herein, it may be assumed that the functional interfaces 204 are serializable, and that the object constructors do not take any parameters. (A constructor is a method for substantiating an object in object oriented programming environments, such as Java, C++, etc.) To access the functionality defined by interface 204 by a remote process (that is, by a process other than one that implements the interface), additional source code must be generated. Implementation 206 is input to code generator 208. Implementation 206 may include one or more classes. Additionally, because a class implementing an interface may implement methods in addition to those defined in the interface, interface 204 is also input to code generator 208. Using the implementation and interface as input data, co-generator 208 outputs remote interface code 210, remote server code 212, static factory class code 214 and client wrapper code 216. This is summarized in FIG. 3, illustrating high level methodology 300 for the automatic generating of code for remotely accessing the functionality defined by interface 204.

The implementation is parsed for method signatures. In this way, the code generator determines the names and parameter lists and returns values for each object type specified in the implementation. Additionally, the interface is parsed, and any methods implemented but not defined in the interface may be omitted from the code generation processes which will be further described below. The remote interface code is generated in step 304, remote server code in step 306, static factory class code in step 308 and client wrapper code in step 310. These blocks of code are generated in response to the method signatures determined from the local interface and implementation. Note that these steps may be performed at build time of the software product but before the actual build (generation of executable code) is performed. In step 312, the source code files are compiled into executable images. In a bytecode interpreted language, such as Java, the executable files typically are bytecode files commonly denoted as .class files. These represent JVM executables. This step may be performed as part of the performance of the build of software product.

Figure 4:
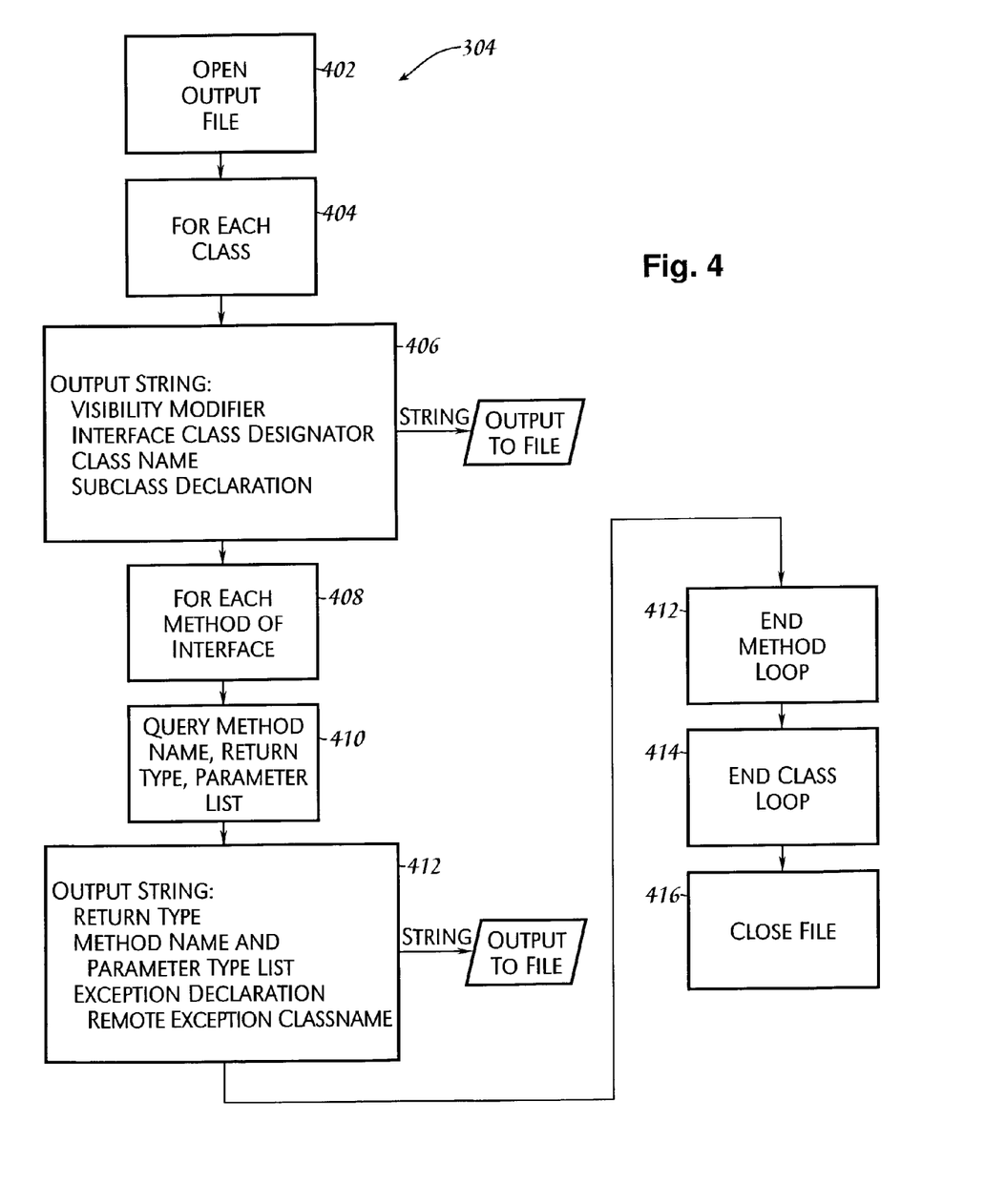
FIG. 4 illustrates in further detail a portion of the methodology of FIG. 3.

Referring now to FIG. 4, there is illustrated therein a flowchart illustrating methodology 304 for generating remote interface code in accordance with the present inventive principles. In step 402, a loop over each class represented in the implementation is entered.

In step 406, an output string is generated. The string includes a visibility modifier, interface class designator, class name and subclass declaration (if any).

A loop over the methods of the interface is entered in step 408, and in step 410, the method name, return type and parameter types are queried. In other words, the method signature for each method is obtained in step 410. This may be done, in an embodiment in accordance with the Java programming language by using the introspection mechanisms provided therein. This would be appreciated by one of ordinary skill in the Java programming art, Java provides a Reflection API that provides methods for querying class members for the method signatures.

In step 412 an output string is generated. The string includes a visibility modifier, return type, method name and parameter type list, an exception declaration and the class name of the class containing the remote exception handler and a statement terminator. Strings generated in step 412 are appended to strings output in step 406

The specific syntax of the output string depends on the particular programming language. An exemplary string in accordance with the Java language syntax is:

```
public interface RemoteClassname extends Remote {
    public ReturnType1 MethodName1(ParameterTypeList1) throws RemoteException;
    public ReturnType2 MethodName2(ParameterTLypeList2) throws RemoteException;
        :
    public ReturnTypeN1 MethodName1(ParameterTypeListN) throws RemoteException;
}.
```

In this exemplary output string, the visibility modifier is "public", the keyword designating the class as an interface is "interface, and the class name is "Remoteclassname". This class is depicted as a subclass of a "Remote" class. If the Java RMI is used as IPC mechanism, the superclass may be the java.rmi.Remote class. This portion of the exemplary string may be generated in step 406, above. The remaining portion of the exemplary string includes, for each method, the return type, which specifies the type of the returned object is "ReturnType1", . . . "ReturnTypeN", respectively, and the corresponding method names are "MethodName1", . . . "MethodNameN. The parameter type lists have, for notational simplicity been depicted in this exemplary output string as "ParameterTypeList1", . . . "ParameterTypeListN". One of ordinary skill in the art would appreciate that the parameter lists may be in the general form: "ParamType1", "ParamType2", . . . "ParamTypeK" (where, in general, K could have a different value for each of the methods. Recall that the parameter list for a particular method is obtained from the method signature. The exception declaration is "throws" and the exception handler class is "RemoteException". In an embodiment of the present invention using the Java RMI IPC mechanism in particular, the exception handler class may be "java.RMI.RemoteException". Note that remote exceptions may be a class of runtime exceptions, which need not be declared. The output string may be written to a source code file which may commonly be designated as .java files. The loops over the methods and classes are terminated in, respectively, steps 412 and 414. In step 416, the output file is closed.

In his exemplary output string, the visibility modifier is "public", the return type, which specifies the type of the returned object is "ReturnType", the method name is "MethodName", and the parameter types in the parameter list are "ParamType1", "ParamType2", . . . "ParamTypeN". Recall that the parameter list for a particular method is obtained from the method signature. The exception declaration is "throws" and the exception handler class is "RemoteException". The statement terminator is ";". The output string may be written to a source code file which may commonly be designated as .java files. Steps 404 and 406 are repeated in the loop for each method of the interface, and the loop terminates in step 408. In step 409 the output file is closed.

Figure 5:
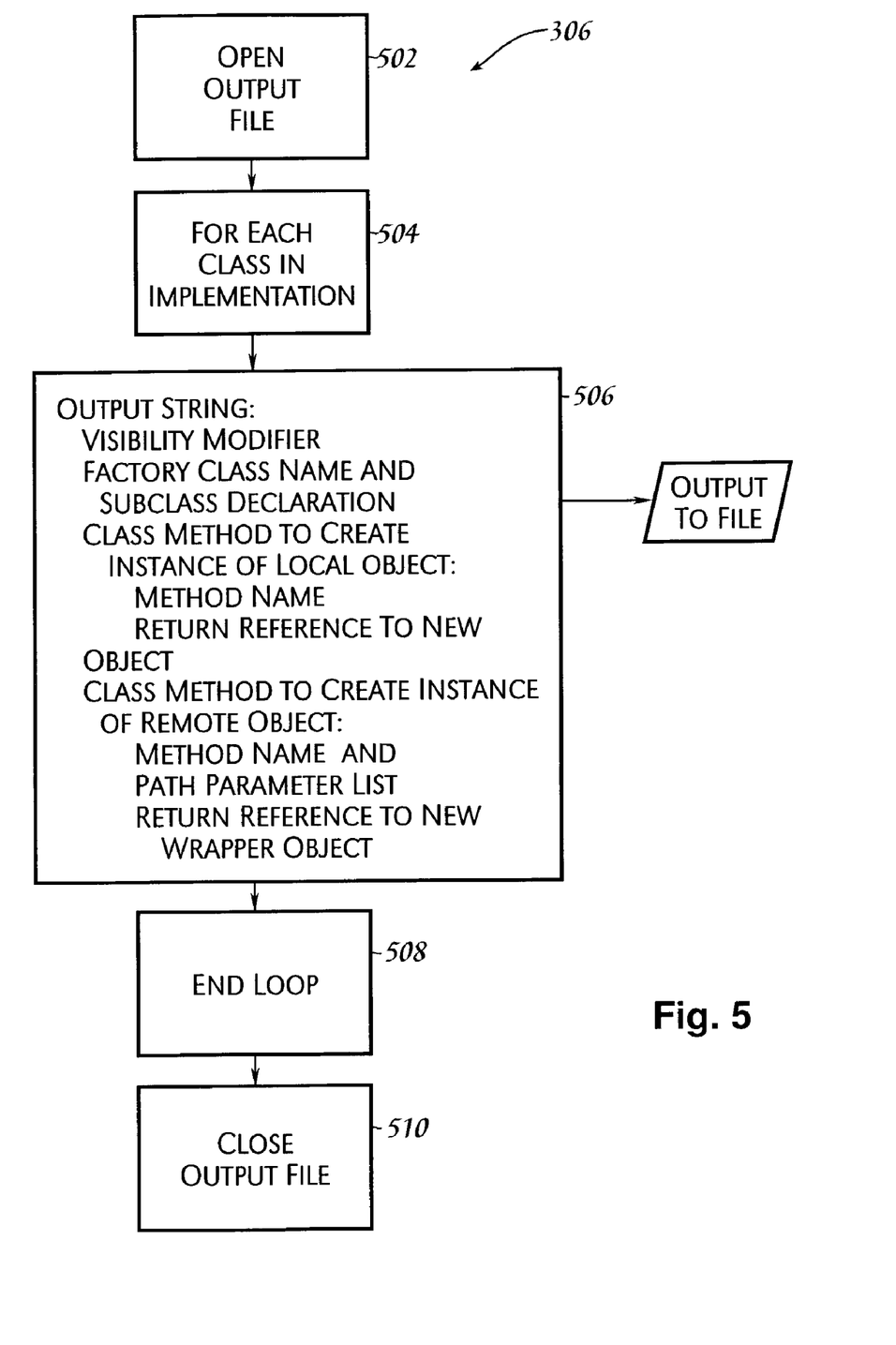
FIG. 5 illustrates a second portion of the methodology of FIG. 3.

Refer now to FIG. 5, illustrating in flow chart form, methodology 306 for generating a static factory class in accordance with the principles of the present invention. In step 502, an output file is opened. In step 504, a loop over each class in the implementation is entered.

In step 506, an output string is generated and written to the output file. The string includes a visibility modifier, a factory class name and subclass declaration. The object factory may be a subclass of an object wrapper (discussed further hereinbelow in conjunction with FIG. 6). The output string also includes a class method to create an instance of a local object which includes the method name and returns a reference to a new object. The output string further includes a class method to create an instance of a remote object which includes a method name and a path parameter list. The path parameter list includes, as input values, a path to the remote object and the name of the remote object. The method returns a reference to a new wrapper object. An exemplary string in accordance with the Java language syntax is as follows:

```
public class ObjectFactory extends ObjectWrapper {
    ObjectType object__instance__name;
    public static GetObject( ) {
        if (object__instance__name = = null) {
            object__instance__name = new ObjectType ( );
            return object__instance__name;
        }
    }
    public static GetObject (string host, int port, string serv__name) {
        if (object__instance __name = = null) {
```

```
        object_instance_name = new ObjectWrapper
((ObjectType) (LookupMethod(host, port, serv_name))
            return object_instance_name;
        }
    }
}
```

In this exemplary output string the visibility modifier is "public", and the factory class name is "ObjectFactory". The class declaration is "ObjectWrapper". The key word "Extends" is the subclass operator in Java. This corresponds to the ":" in C++, for example. The ObjectFactory class includes an instance variable, "object_instance_name" of type "ObjectType" and method definition blocks for the overloaded method "GetObject". As discussed in conjunction with step 506, the first implementation of the GetObject method returns a reference to an object of type ObjectType. The second definition of the overloaded GetObject method includes, as input, the path to the remote object, and returns a reference to an object of type "TypeObjectWrapper". As will be discussed hereinbelow, is a subclass of the Object-Type class, and is thus also an instance of an ObjectType object. In the exemplary output string, a lookup method is called to return a reference to the remote object specified by the input parameter list. For example, an embodiment of the present invention in a Java environment, the Java Naming and Directory Interface™ (JNDI) may be used. JNDI is an API that provides naming and directory functionality to Java applications. JNDI is independent of any specific directory naming service implementation and may be used, for example, with the Java Remote Method Invocation (RMI) Registry or the Lightweight Directory Access Protocol (LDAP) naming and directory services. It would be appreciated by those of ordinary skill in the art that other directory and naming services may be used in conjunction with the present invention, and such alternative embodiments would fall within the spirit and scope of the present invention. Additionally, the methodology of step 306 may be used with other programming languages, such as C++, and the corresponding syntax of the output strings generated in step 306 would be within the skill of those of ordinary skill in the respective programming arts.

Step 506 is repeated for each class represented in the implementation, and the loop terminates in step 508. In step 510, the output file is closed.

Figure 6:
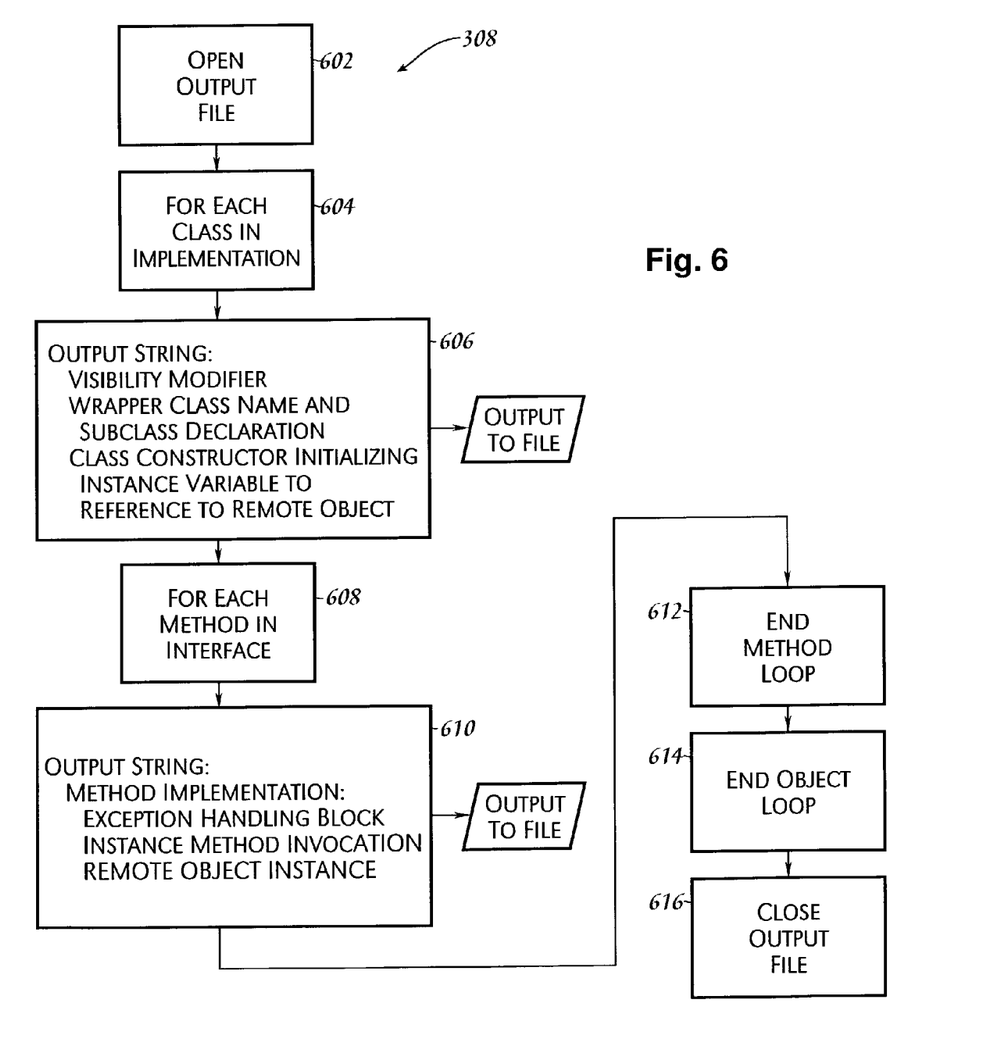
FIG. 6 illustrates, in flow chart form, a third portion of the methodology of FIG. 3.

Refer now to FIG. 6, illustrating, in flow chart form, the methodology for generating client wrapper code, step 308, FIG. 3, in further detail. In step 602 an output file is opened, and in step 604 a loop over each class represented the implementation is entered.

In step 606, an output string is written to the file opened in step 602. The output string includes a visibility modifier and wrapper class name and subclass declaration. The ObjectWrapper class subclasses the class of "ObjectType" and implements the interface. The output string also includes a class constructor for initializing an instance variable of "ObjectType". As will be discussed hereinbelow, the constructor operates to initialize the instance variable to a reference to the remote object.

In step 608, a loop over the methods of the interface is entered. For each method of the interface, in step 610, a string is output defining the method implementation. The implementation is embedded in an exception handling block and includes an instance method invocation on the remote object specified by the reference returned by the class constructor. Strings generated in step 608 may be appended to the strings generated in step 606.

An exemplary output string which may represent, schematically, an output string from steps 606 and 610 in accordance with a Java language and programming environment is:

```
public class ObjectWrapper extends ObjectType implements
InterfaceName {
    ObjectType remote_impl_instance;
    public ObjectWrapper (ObjectType object_instance] {
    remote_impl_instance = object_instance;
    }
    ReturnType MethodName1 (Parameter_List1) {
        try {
            return remote_impl_instance.
            MethodName1(Parameter_List1);
        }
        catch (RemoteException e_name1) {
            throws new WrapperException (e_name);
        }
    ReturnType MethodName2 (Parameter_List2) {
        try {
            return remote_impl_instance.
            MethodName2(Parameter_List2;
        }
        catch (RemoteException e_name2) {
            throws new WrapperException (e_name2);
        }
                    :
    ReturnType MethodNameN (Parameter_ListN) {
        try {
            return remote_impl_instance.
            MethodName1(Parameter_ListN);
        }
        catch (RemoteException e_nameN) {
            throws new WrapperException (e_nameN);
        }
}.
```

In this exemplary output string, also in a Java context, the class "ObjectWrapper" is defined and declared as a subclass of the ObjectType class and implements "InterfaceName". The constructor initializes an ObjectType instance. Recall that the ObjectFactory class, as discussed hereinabove, calls the ObjectWrapper constructor and initializes the instance of ObjectType to the remote object. The exemplary class then includes the method implementations, here a set of N methods of the interface. Each of the method implementations invokes the corresponding instance method of the remote object and returns the result thereof. Additionally, each implementation is embedded in an exception handler, in the context of the Java programming language an "try-catch" block. In this exemplary string, the catch clause throws an instance of "WrapperException". The WrapperException class may be a user specified exception handler subclass to the RemoteException class, which is a standard Java class. The particular details of the exception handler do not implicate the present inventive principles, and would be within the skills of those of ordinary skill in the data processing art. Also note that in the exemplary code, for simplicity, for each catch clause throws the same exception handler class. However, those of ordinary skill in the art would also recognize that the exception handlers associated with particular methods need not be the same. Again, the particular exception handling mechanisms employed in an embodiment of the present invention do not implicate the inventive principles thereof and such embodiments would fall with the spirit and scope of the present invention.

The loops over the methods and objects are terminated in, respectively, steps 612 and 614. In step 616, the output file is closed.

Figure 7:
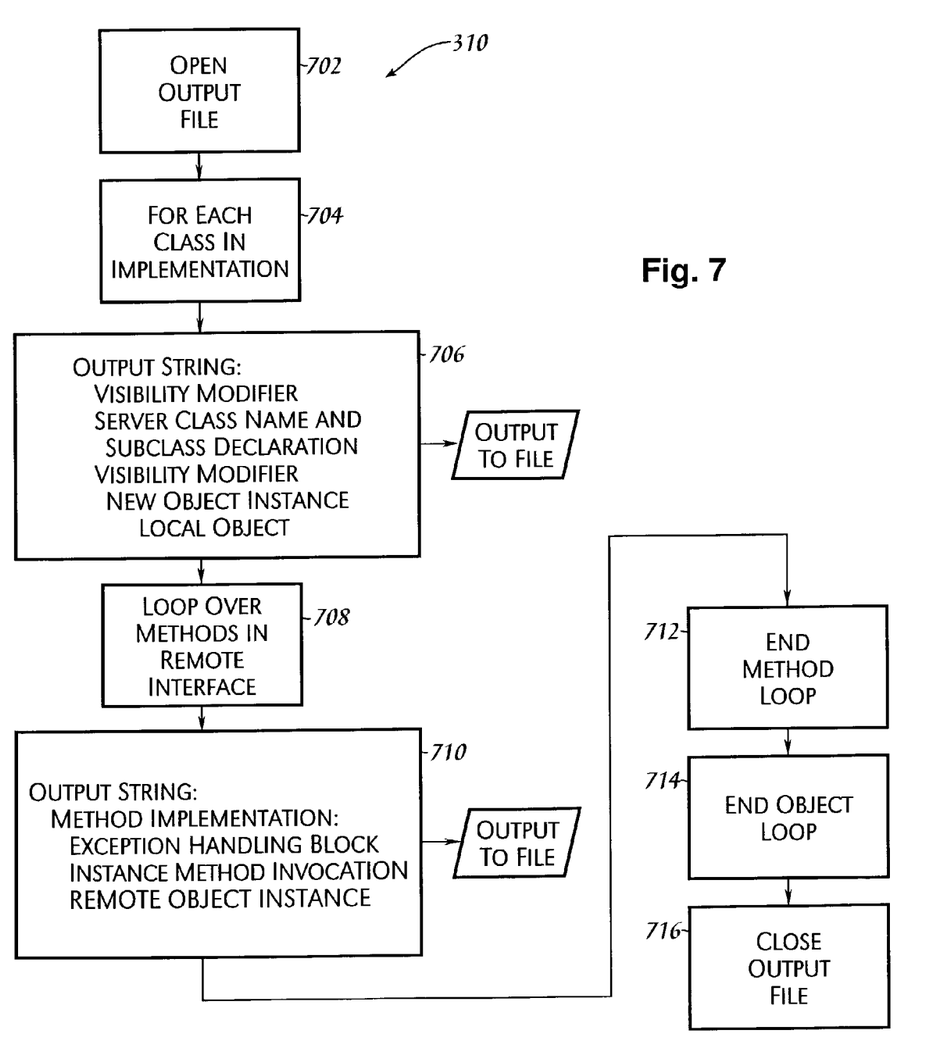
FIG. 7 illustrates in further detail a portion of the methodology of FIG. 3.

Refer now to FIG. 7, illustrating, in flow chart form, the methodology for generating remote server code, step 310, FIG. 3, in further detail. In step 702 an output file is opened, and in step 704 a loop over each class represented in the implementation is entered.

In step 706, an output string is written to the file opened in step 702. The output string includes a visibility modifier and server class name and subclass declaration. The remote server class may subclass a remote object and implement a remote interface. The output string also includes an instantiation of the local implementation.

In step 708, a loop over the methods of the interface is entered. For each method of the interface, in step 710, a string is output defining the method implementation. The implementation is embedded in an exception handling block and includes an instance method invocation on local instance of the implementation class.

An exemplary output string which may represent, schematically, an output string from steps 706 and 710 in accordance with a Java language and programming environment is:

```
public class RemoteClassnameServer extends UnicastRemoteObject
implements
RemoteClassname {
    private Classname localObject = new ClassImpl( );
    public Return Type MethodName1 (ParamList1) throws
    RemoteException {
        try {
            return localObject.MethodName1(ParamList1);
        }
        catch (Exception e) {
            throw new RemoteException (e);
            {
        }
    }
}
    public ReturnType2 MethodName2 (ParamList2) throws
    RemoteException {
        try {
            return localObject.MethodName2(ParamList2);
        }
        catch (Exception e) {
            throw new RemoteException (e);
        }
    }
        :
    public ReturnTypeN MethodNameN (ParamListN) throws
    RemoteException {
        try {
            return localObject.MethodNameN(ParamListN);
        }
        catch (Exception e) {
            throw new RemoteException (e);
        }
    }
}.
```

In this exemplary output string, also in a Java context, the server class "RemoteClassnameServer" is defined and declared as a subclass of a UnicastRemoteObject class. If the Java RMI is used as IPC mechanism, the superclass may be the java.rmi.UnicastRemoteObject class. The class also implements the remote interface, denoted "InterfaceName". The "new" operator creates an instance of the local implementation, declared "private" in the example.

The exemplary class then includes the method implementations, here a set of N methods of the remote interface. Each of the method implementations invokes the corresponding instance method local implementation and returns the result thereof. As discussed above, the parameter lists of the methods are depicted in a simplified form, to reduce the notational complexity of the examplary code. The representation of a parameter list for a particular method implementation would be within the skill of those of ordinary skill in the relevant programming art.

Additionally, each implementation is embedded in an exception handler, in the context of the Java programming language an "try-catch" block. In this exemplary string, the catch clause throws an instance of "RemoteException". The RemoteException class is a standard Java class. The particular details of the exception handler do not implicate the present inventive principles, and would be within the skills of those of ordinary skill in the data processing art. Also note that in the exemplary code, for simplicity, for each catch clause throws the same exception handler class. However, those of ordinary skill in the art would also recognize that the exception handlers associated with particular methods need not be the same. Again, the particular exception handling mechanisms employed in an embodiment of the present invention do not implicate the inventive principles thereof and such embodiments would fall with the spirit and scope of the present invention.

The loops over the methods and classes are terminated in, respectively, steps 712 and 714. In step 716, the output file is closed.

Figure 8:
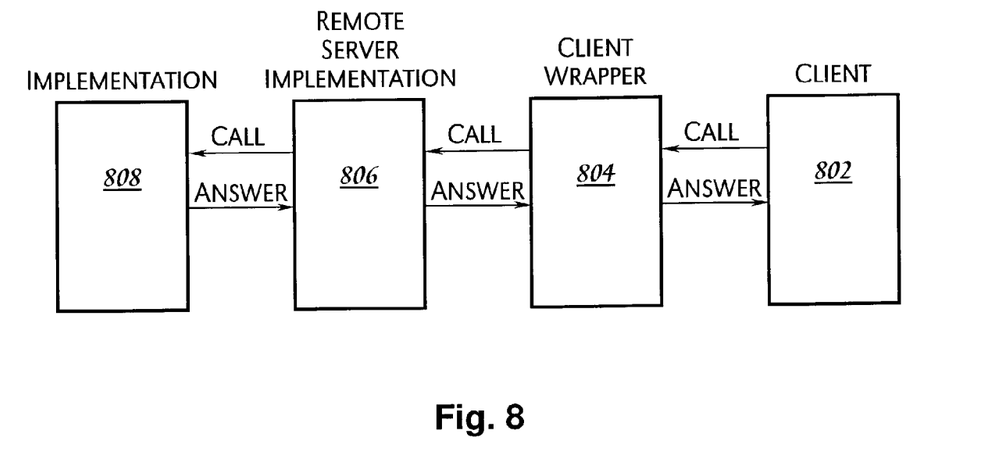
FIG. 8 illustrates an interprocess communication (IPC) architecture that embodies the principles of the methodology of FIG. 3.

The principles of the present invention may be further understood by referring to FIG. 8 which is schematically illustrated in interprocess communication architecture embodying the present inventive principles. A client application that uses the services of a remote process invokes the method implementing the functionality via a call to client wrapper 804. For example, client 802 may invoke MethodK of the interface. In accordance with the present invention and the notation of the exemplary code previously described, client 802 may effect the invocation by calling the instance method of the remote object. This may be, in the notation of the previous exemplary Java constructs:

ObjectFactory.GetObject("host_name", "port_number", "remote server name").MethodNameK(input_Param_ListK);

In contrast, the process implementing the interface invokes the same method by the same call in which the overloaded GetObject method is called with the empty parameter list:

ObjectFactory.GetObject( ).MethodNameK(input_Param_ListK);

Thus, an application calling the functionality remotely invokes the methods of the interface using constructs that are of the same form as the invocations by the implementing process itself.

Client wrapper 804 forwards the method call to the server implementation 806 which passes the call to implementation 808 that executes the functionality. The answer is returned from the implementation to remote server implementation 806 to client wrapper 804 to the requesting client 802.

Figure 9:
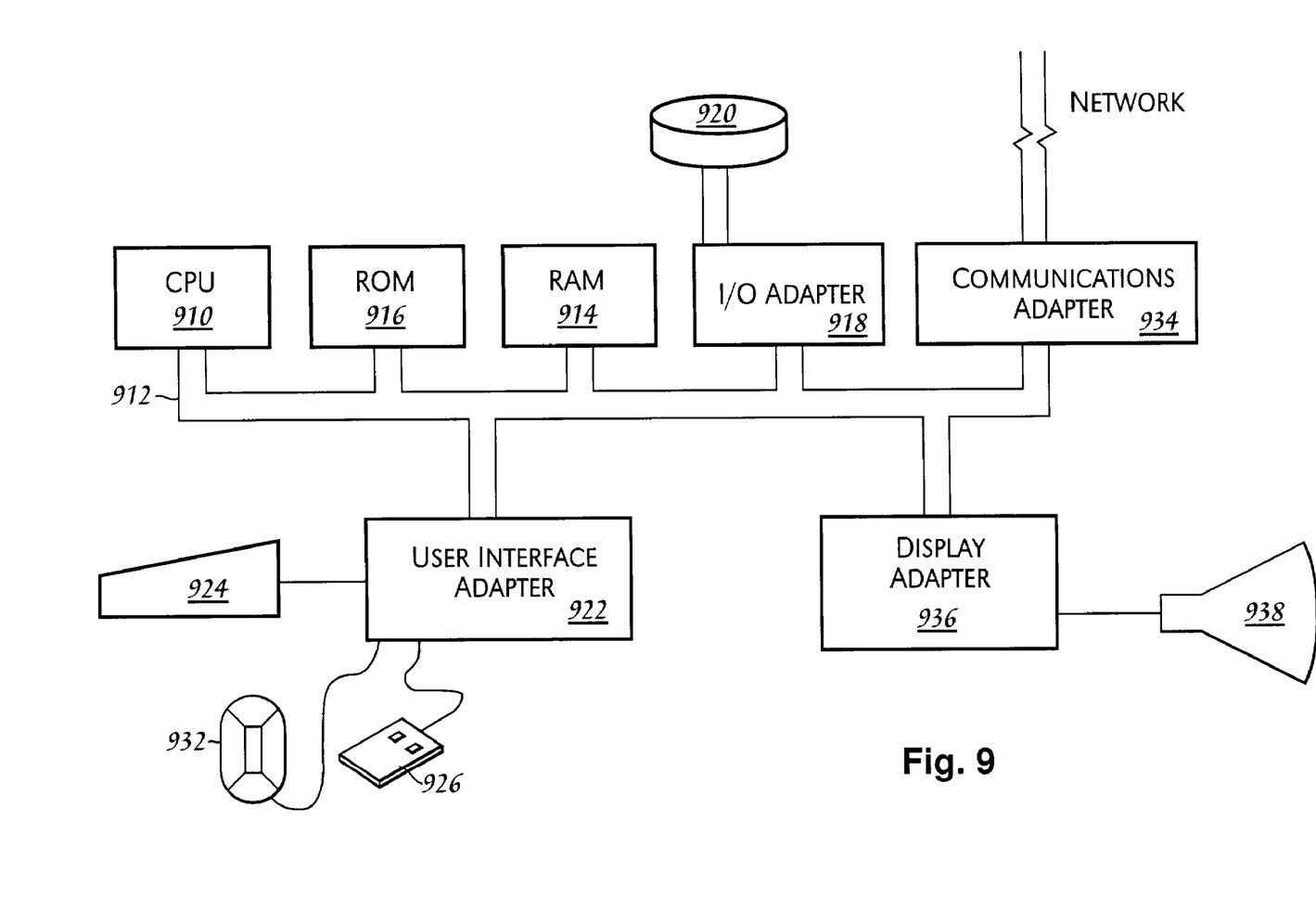
FIG. 9 illustrates, in block diagram form, a data processing system for automated code generation in accordance with another embodiment of the present invention.

A data processing system which may be used in conjunction with the methodology of FIG. 3, is illustrated in FIG. 9. FIG. 9 illustrates an exemplary hardware configuration of data processing system 900 in accordance with the subject invention. The system in conjunction with methodology 300, may be used to generate code to access remote functionality in accordance with the present inventive principles. Data processing system 900 includes central processing unit (CPU) 910, such as a conventional microprocessor, and a number of other units interconnected via system bus 912.

Data processing system 900 also includes random access memory (RAM) 914, read only memory (ROM) 916 and input/output (I/O) adapter 918 for connecting peripheral devices such as disk units 920 to bus 912, user interface adapter 922 for connecting keyboard 924, mouse 926, trackball 932 and/or other user interface devices such as a touch screen device (not shown) to bus 912. System 900 also includes communication adapter 934 for connecting data processing system 900 to a data processing network, enabling the system to communicate with other systems, and display adapter 936 for connecting bus 912 to display device 938. CPU 910 may include other circuitry not shown herein, which will include circuitry commonly found within a microprocessor, e.g. execution units, bus interface units, arithmetic logic units, etc. CPU 910 may also reside on a single integrated circuit.

Preferred implementations of the invention include implementations as a computer system programmed to execute the method or methods described herein, and as a computer program product. According to the computer system implementation, sets of instructions for executing the method or methods are resident in the random access memory 914 of one or more computer systems configured generally as described above. These sets of instructions, in conjunction with system components that execute them may generate code for remotely accessing functionality, as described above in conjunction with FIGS. 3–7. Until required by the computer system, the set of instructions may be stored as a computer program product in another computer memory, for example, in disk drive 920 (which may include a removable memory such as an optical disk or floppy disk for eventual use in the disk drive 920). Further, the computer program product can also be stored at another computer and transmitted to the users work station by a network or by an external network such as the Internet. One skilled in the art would appreciate that the physical storage of the sets of instructions physically changes the medium upon which is the stored so that the medium carries computer readable information. The change may be electrical, magnetic, chemical, biological, or some other physical change. While it is convenient to describe the invention in terms of instructions, symbols, characters, or the like, the reader should remember that all of these in similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Although the present invention and its advantages have been described in detail, it should be understood that various changes, substitutions and alterations can be made herein without departing from the spirit and scope of the invention as defined by the appended claims.

What is claimed is:

1. A method for producing source code for remotely accessing functionality in a local process comprising:
    generating a remote interface corresponding to a predetermined local interface;
    generating a factory class corresponding to a class of the local interface, wherein the factory class returns a reference to the local interface, and wherein a remote client accessing the functionality in response to the reference;
    generating a remote server class, wherein the remote server class is operable for obtaining a reference to an implementation of the local interface;
    generating a wrapper class of the remote interface, wherein the wrapper class is operable for obtaining a reference to an instance of the remote server class, the wrapper class being operable for accessing the functionality via an instance of the remote server class.

2. The method of claim 1 wherein the factory class includes an exception handling block operable for handling an instance of a runtime exception class.

3. The method of claim 2 wherein the instance of the runtime exception class comprises an instance of a remote exception class.

4. The method of claim 1 wherein the factory class comprises first and second overloaded methods, the first and second methods operable for returning the reference to the remote interface.

5. The method of claim 4 wherein the first method returns the reference as a reference to an instance of the class of the local interface, and the second method returns the reference as a reference to an instance of the client wrapper class.

6. The method of claim 5 wherein the remote server is operable for deployment on a data processing system running the local implementation, the second method returning the reference in response to an input parameter string representing a path to the remote server.

7. A computer program product embodied in a tangible storage medium for producing source code for remotely accessing functionality in a local process comprising programming instructions for:
    generating a remote interface corresponding to a predetermined local interface;
    generating a factory class corresponding to a class of the local interface, wherein the factory class returns a reference to the local interface, and wherein a remote client accessing the functionality in response to the reference;
    generating a remote server class, wherein the remote server class is operable for obtaining a reference to an implementation of the local interface;
    generating a wrapper class of the remote interface, wherein the wrapper class is operable for obtaining a reference to an instance of the remote server class, the wrapper class being operable for accessing the functionality via an instance of the remote server class.

8. The program product of claim 7 wherein the factory class includes an exception handling block operable for handling an instance of a runtime exception class.

9. The program product of claim 8 wherein the instance of the runtime exception class comprises an instance of a remote exception class.

10. The program product of claim 7 wherein the factory class comprises first and second overloaded methods, the first and second methods operable for returning the reference to the remote interface.

11. The program product of claim 10 wherein the first method returns the reference as a reference to an instance of the class of the local interface, and the second method returns the reference as a reference to an instance of the client wrapper class.

12. The program product of claim 11 wherein the remote server is operable for deployment on a data processing system running the local implementation, the second method returning the reference in response to an input parameter string representing a path to the remote server.

13. A system for producing source code for remotely accessing functionality in a local process comprising:
  circuitry operable for generating a remote interface corresponding to a predetermined local interface;
  circuitry operable for generating a factory class corresponding to a class of the local interface, wherein the factory class returns a reference to the local interface, and wherein a remote client accessing the functionality in response to the reference;
  circuitry operable for generating a remote server class, wherein the remote server class is operable for obtaining a reference to an implementation of the local interface;
  circuitry operable for generating a wrapper class of the remote interface, wherein the wrapper class is operable for obtaining a reference to an instance of the remote server class, the wrapper class being operable for accessing the functionality via an instance of the remote server class.

14. The system of claim 13 wherein the factory class includes an exception handling block operable for handling an instance of a runtime exception class.

15. The system of claim 14 wherein the instance of the runtime exception class comprises an instance of a remote exception class.

16. The system of claim 15 wherein the factory class comprises first and second overloaded methods, the first and second methods operable for returning the reference to the remote interface.

17. The system of claim 16 wherein the first method returns the reference as a reference to an instance of the class of the local interface, and the second method returns the reference as a reference to an instance of the client wrapper class.

18. The system of claim 17 wherein the remote server is operable for deployment on a data processing system running the local implementation, the second method returning the reference in response to an input parameter string representing a path to the remote server.

19. The system of claim 13 wherein circuitry for generating the remote interface, the wrapper class, the remote server class and the factory class is operable at build time of a software product comprising the local implementation.

20. A software architecture embodied in a tangible storage medium for producing source code for remotely accessing functionality in a local process comprising:
  a remote interface corresponding to a predetermined local interface;
  a factory class corresponding to a class of the local interface, wherein the factory class returns a reference to the local interface, and wherein a remote client accessing the functionality in response to the reference;
  a remote server class, wherein the remote server class is operable for obtaining a reference to an implementation of the local interface;
  a wrapper class of the remote interface, wherein the wrapper class is operable for obtaining a reference to an instance of the remote server class, the wrapper class operable for accessing the functionality via an instance of the remote server class.

* * * * *